(12) United States Patent
Asami et al.

(10) Patent No.: US 6,713,581 B2
(45) Date of Patent: Mar. 30, 2004

(54) CROSSLINKABLE POLYMER MATERIAL OF LOW RELATIVE PERMITTIVITY, AND FILMS, SUBSTRATES AND ELECTRONIC UNITS FORMED OF IT

(75) Inventors: Shigeru Asami, Tokyo (JP); Toshiaki Yamada, Tokyo (JP); Teruaki Sugahara, Shiga (JP); Hiroshi Hotta, Kyoto (JP)

(73) Assignees: TDK Corporation, Tokyo (JP); Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 10/056,119

(22) Filed: Jan. 24, 2002

(65) Prior Publication Data

US 2002/0137867 A1 Sep. 26, 2002

(30) Foreign Application Priority Data

Jan. 24, 2001 (JP) .......................................... 2001-16364

(51) Int. Cl.[7] .............................................. C08F 224/00
(52) U.S. Cl. ....................................... 526/273; 526/268
(58) Field of Search .................................. 526/268, 273

(56) References Cited

U.S. PATENT DOCUMENTS 4,051,194 A    9/1977  Ishikawa et al.

FOREIGN PATENT DOCUMENTS

EP    0788118    8/1997
JP    9-208627   8/1997

OTHER PUBLICATIONS

Dielectric Behaviour of Glycidyl Methacrylate–Butyl Methacrylate Copolymers S. H. El–Hamouly et al Journal of Materials Science, Chapman and Hall Ltd., London, GB 2B, Nr. 25 1251–1254.

*Primary Examiner*—Robert Dawson
*Assistant Examiner*—D. Aylward
(74) *Attorney, Agent, or Firm*—Jordan and Hamburg LLP

(57) ABSTRACT

Disclosed is a polymer material of low relative permittivity obtained through copolymerization of a monomer composition that contains, as monomers, a fumaric diester and an epoxy group-having (meth)acrylate. The polymer material bonds or adheres well to metal conductor layers, and, after crosslinked, it is patternable. In addition, it has good electric properties of low relative permittivity, low dielectric loss tangent and good electric insulation, and has good heat resistance.

7 Claims, No Drawings

CROSSLINKABLE POLYMER MATERIAL OF LOW RELATIVE PERMITTIVITY, AND FILMS, SUBSTRATES AND ELECTRONIC UNITS FORMED OF IT

BACKGROUND OF THE INVENTION

The present invention relates to a novel, patternable polymer material of low relative permittivity, and to films, substrates and electronic units formed of it. More precisely, the invention relates to such a polymer material of low relative permittivity, which has good electric properties of low relative permittivity and low dielectric loss tangent in a high-frequency band, and which has good heat resistance even at high temperatures and good bondability and good adhesiveness to metal leaf, and has the ability to form thin-film patterns.

With the significant increase in communications intelligence in these days, greatly desired are small-sized, lightweight and high-speed communications media, for which, therefore, desired are polymer materials of low relative permittivity. In particular, portable mobile communications and satellite communications of, for example, car telephones and digital portable telephones require a radio wave of a high-frequency band of the level of megahertz to gigahertz. For supporting the significant development of communications media for means of such communications, tried is a technique of increasing the mounting density of small-sized electronic devices on substrates. For attaining the intended, small-sized and lightweight communications media applicable to such a high-frequency band of the level of megahertz to gigahertz, it is necessary to develop electric insulating materials that ensure a lot of latitude in high-frequency transmission capabilities of communication media. For further increasing the mounting density of electronic devices on substrates, employed is a build-up method of laminating a number of insulating layers on a substrate, apart from a method of fabricating multi-layered laminate boards. In addition to having good electric properties, the polymer materials to be used in such a build-up method must be patternable in order that via-holes may be formed through their layers.

For the materials having good electric properties of, for example, electric insulation and low relative permittivity, generally proposed are thermoplastic resins such as polyolefins, chlorinated polyvinyl chloride resins and fluororesins; and thermosetting resins such as unsaturated polyester resins, polyimide resins, epoxy resins, vinyltriazine resins (BT resins), crosslinkable polyphenylene oxides and curable polyphenylene ethers.

For electric-insulating materials of low relative permittivity and low dielectric loss, proposed are copolymers of cyclohexyl-having fumaric diesters and vinylic monomers, as in JP-A 208627/1997. However, the electric-insulating materials proposed are problematic in point of the patternability in use for built-up substrates, since their crosslink density is difficult to control and since they could not ensure fine patterns.

On the other hand, for other patternable materials having good electric properties, proposed are photosensitive unsaturated polyester resins, photosensitive polyimide resins and photosensitive epoxy resins. Of those, photosensitive epoxy resins are practicable for the intended purpose, and they are generally photo-cured for pattern formation.

These patternable materials are relatively resistant to heat, of which, however, epoxy resins and unsaturated polyester resins are not still unsatisfactory in point of their electric properties since their relative permittivity is at least 3 and is relatively high. On the other hand, photosensitive polyimide resins are not still on the level of practical use.

SUMMARY OF THE INVENTION

The object of the present invention is to provide a polymer material of low relative permittivity, of which the advantages are that it bonds and adheres well to metal conductor layers, it has the ability to form patterns through crosslinking, it has good electric properties of low relative permittivity, low dielectric loss tangent and good electric insulation, and it has good heat resistance, high film strength and good workability.

Another object of the invention is to provide a substrate fabricated by coating polymer material of low relative permittivity or by laminating a film of that polymer material onto an insulating substrate base, of which the advantage is that the substrate is well workable to form patterns thereon through crosslinking of the polymer material. Further the object of the invention is to provide an electronic unit formed of the polymer material of low relative permittivity that is favorable for use in a high-frequency region.

To attain the objects above, the invention provides a polymer material of low relative permittivity obtained through copolymerization of a monomer composition that contains, as monomers, a fumaric diester and an epoxy group-having (meth)acrylate.

The terminology "(meth)acrylate" referred in the invention is meant to indicate an acrylate or a methacrylate.

In the polymer material of low relative permittivity of the invention, one monomer, fumaric diester is preferably represented by the following formula (I):

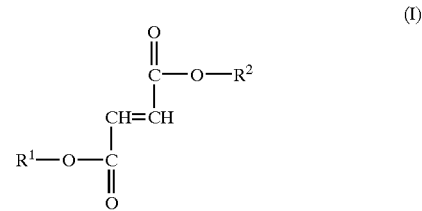

wherein $R^1$ represents an alkyl group or a cycloalkyl group; $R^2$ represents an alkyl group, a cycloalkyl group or an aryl group; and $R^1$ and $R^2$ may be the same or different.

In the polymer material of low relative permittivity of the invention, the other monomer, epoxy group-having (meth)acrylate is preferably represented by following formula (II):

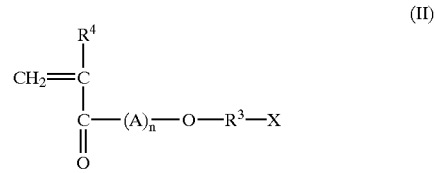

wherein $R^3$ represents an alkylene group having from 1 to 4 carbon atoms; $R^4$ represents H or $CH_3$; A represents an alkylene oxide having from 2 to 4 carbon atoms; n indicates an integer from 0 to 2; and X represents

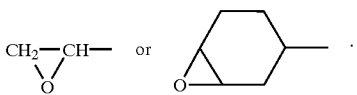

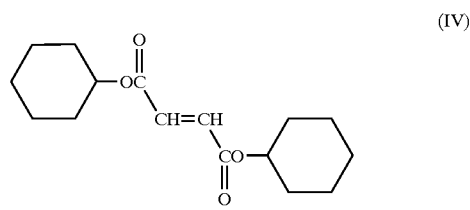

The polymer material of low relative permittivity of the invention is obtained through copolymerization of such fumaric diester and such an epoxy group-having (meth) acrylate, and its advantages are that it is patternable through crosslinking, it forms films well and is resistant to heat, and it bonds and adheres well to metal conductor layers. Its other advantages are that the polymer material has good electric properties of low relative permittivity, low dielectric loss tangent and good electric insulation even in a high-frequency band level of megahertz to gigahertz.

Using the polymer material of low relative permittivity of the invention realizes easy and simple formation of electric-insulating films of good adhesion to metal conductor layers, and realizes multi-layered substrates of good workability to form patterns, and further realizes electronic units suitable for use in a high-frequency region.

DETAILED DESCRIPTION OF THE PREFERRED EMBODIMENTS

Preferred embodiments of the invention are described in detail hereinunder.

Having the ability to form patterns through crosslinking, the polymer material of low relative permittivity of the invention is obtained by copolymerizing a monomer composition that contains, as monomers, fumaric diester and an epoxy group-having (meth)acrylate, and this is a copolymer containing epoxy groups in the molecule.

The fumaric diester used to form the polymer material of the invention is not specifically limited and may be any one provided it has the ability to lower the relative permittivity of the polymer material and to make the polymer material resistant to heat. Preferably, however, the fumaric diester for use in the invention is represented by formula (I) mentioned above.

In formula (I), the alkyl group for $R^1$ and $R^2$ preferably has from 2 to 12 carbon atoms, and it may be linear or branched, and may be substituted with halogen atom(s), etc. Concretely, it includes, for example, ethyl, n-propyl, isopropyl, n-butyl, sec-butyl, tert-butyl, pentyl, hexyl, nonyl and dodecyl groups.

In formula (I), the cycloalkyl group for $R^1$ and $R^2$ preferably has from 3 to 14 carbon atoms, and it may be monocyclic or crosslinked, and may be substituted with alkyl group(s), etc. Concretely, it includes, for example, cyclopentyl, cyclohexyl, adamantyl and dimethyladamantyl groups.

In formula (I), the aryl group for $R^2$ preferably has from 6 to 18 carbon atoms. It may be polycyclic, but is preferably monocyclic; and it may be substituted. One concrete example of it is a phenyl group.

Preferred examples of the fumaric diester are diisopropyl fumaric diester, dicyclohexyl fumaric diester and di-sec-butyl fumaric diester. Of those, more preferred is dicyclohexyl fumaric diester of the following formula (IV):

The epoxy group-having (meth)acrylate for use in the invention is not specifically limited and may be any one having epoxy group(s) in the molecule. Preferred for use herein are (meth)acrylates of formula (II) mentioned above.

In formula (II), the alkylene group represented as $R^3$ may be linear or branched. Concretely, it includes, for example, methylene, ethylene, trimethylene, propylene and tetramethylene groups.

In formula (II), $R^4$ is H or $CH_3$. In case where $R^4$ is H, the esters of formula (II) are acrylates; and in case where $R^4$ is $CH_3$, they are methacrylates.

In formula (II), the alkylene oxide for A is not indispensable, but including, for example, ethylene oxide and propylene oxide.

Preferred examples of the epoxy group-having (meth) acrylate are glycidyl (meth)acrylate, and 3,4-epoxycyclohexylmethanol (meth)acrylate. Of those, more preferred is 3,4-epoxycyclohexylmethanol acrylate of the following formula (III):

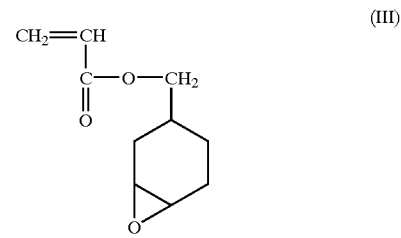

In the polymer material of the invention, the epoxy group-having (meth)acrylate monomer is to make the polymer material have the ability to form patterns. The blend ratio of the monomer to form the polymer material is not specifically determined, and may be determined depending on the site where the polymer material is to be used and on the profile of the patterns to be formed. In general, however, the blend ratio of the monomer preferably falls between 5 mol % and 60 mol % of all the monomer component to form the polymer material.

The polymer material of the invention comprises the copolymer of a fumaric diester and an epoxy group-having (meth)acrylate as in the above, and the copolymer may be in any form of random copolymers, alternate copolymers and block copolymers. The monomer composition for use herein generally comprises, as monomers, the fumaric diester and the epoxy group-having (meth)acrylate as above, but may optionally contain any other vinyl monomers not overstepping the scope and the sprit of the invention.

The molecular weight of the polymer material of low relative permittivity of the invention is not specifically defined. For example, when the polymer material is to form layers on an insulating substrate in a build-up process, the polymer layers formed could be well supported by the insulating substrate since the mechanical strength of the substrate is relatively high. In addition, after the substrate has been coated with the polymer material or after a film of the polymer material has been adhered to the substrate, the polymer material is crosslinked and therefore the mechanical strength of the thus-crosslinked polymer layer could be increased. For these reasons, the mechanical strength of the polymer material itself need not be so high like that of the insulating substrate, and the molecular weight thereof also need not be so high like that of the insulating substrate. Concretely, the molecular weight of the polymer material may be enough for film formation, for example, at least 1000 in terms of the number-average molecular weight thereof.

For forming the fumaric diester polymer in the invention, any ordinary method of radical polymerization can be employed. The polymerization initiator to be used for it must not be heated too much for protecting the epoxy group in the monomer. Preferably, therefore, one or more of organic peroxides and azo compounds are used for the polymerization initiator, having a half-life temperature of not higher than 80° C.

The polymerization initiator of that type includes, for example, organic peroxides such as benzoyl peroxide, diisopropyl peroxydicarbonate, t-butylperoxy di-2-ethylhexanoate, cumene peroxide, t-butylhydroperoxide; and azo compounds such as 2,2'-azobisbutyronitrile, azobis (2,4-dimethylvaleronitrile), 1,1'-azobis(cyclohexane-1-carbonitrile), 2,2'-azobis(2,4-dimethylvaleronitrile). The amount of the polymerization initiator to be used is preferably at most 10 parts by weight, more preferably at most 5 parts by weight relative to 100 parts by weight of the starting monomer component.

The polymerization may be effected in any ordinary manner. In general, the monomer component may be polymerized in a mode of solution polymerization in the presence of an inert gas, at a temperature falling between 30° C. and 100° C. for a period of time falling between 10 hours and 72 hours, though depending on the type of the polymerization initiator used. In that condition, the monomer component is polymerized to give a predetermined high-molecular polymer.

The polymer material of the invention, thus obtained, has the ability to form patterns through crosslinking, and its relative permittivity is low. The other advantages of the polymer materials are that its film-forming ability is good, its adhesiveness to metals is good, and its mechanical properties are good.

The polymer material of low relative permittivity of the invention is dissolved in an organic solvent and formed into a film by removing the solvent. In that manner, the polymer material may be readily and simply formed into an electric-insulating film or layer having good adhesiveness to metal conductors. In this process, when an epoxy ring-opening polymerization catalyst is added to the organic solvent, the epoxy group in the polymer formed may be readily crosslinked through exposure of the polymer film to heat or radiation. In that manner, the mechanical properties of the polymer film formed may be further improved. In particular, when the polymer film is exposed to radiation through a pattern film (photomask), its part exposed to radiation is crosslinked and the solubility in solvent of that crosslinked part is significantly reduced. In this case, the non-cured part of the polymer film may be removed by washing it with a solvent, and the polymer film may be patterned in any desired manner.

The radiation employable in the method includes, for example, IR (infrared) rays, UV (ultraviolet) rays and electron rays. Of those, generally used are UV rays in view of the exposure sensitivity of the polymer material and of the line width of the patterns formed. The epoxy polymerization initiation catalyst may be any and every one having the ability to initiate epoxy polymerization through exposure to radiation. In general, it may be a cationic photopolymerization catalyst, including, for example, diazonium compounds, iodonium compounds, metal complexes, and aluminium complex/allylcyanol compounds.

For its applications, the polymer material of low relative permittivity of the invention may be used in various forms. For example, it may be formed into a film or may be applied onto a substrate, as so mentioned hereinabove, or it may be formed into bulks or moldings. Accordingly, the polymer material of the invention has many applications, for example, for substrates for various electronic units such as high-frequency oscillators, filters, capacitors, inductors and antennas; supports for chips such as filters (e.g., C filters for multi-layered substrates), oscillators (e.g., triplate oscillators) and dielectric oscillators; housings and casings for various substrates and electronic units; and coating materials for them.

The film of the invention may be formed of the polymer material of low relative permittivity alone, or may be formed by infiltrating the polymer material into glass fibers. For forming a film of the polymer material alone, for example, employable is a casting method that comprises uniformly dissolving the polymer material in a solvent followed by casting the resulting polymer solution onto a mold of, for example, sheet glass, silicone rubber plate or metal plate and evaporating the solvent to thereby form a uniform film on the mold. In the other method of using glass fibers for forming the polymer film, for example, the solution of the polymer material of low relative permittivity is infiltrated into glass fibers and then the solvent is evaporated away.

The substrate includes, for example, on-board substrates for mounting chips thereon, and copper-clad laminate substrates, further including substrates with built-in circuits therein, and antenna substrates (e.g., patch antennas).

To fabricate insulating substrates having a predetermined thickness from the film mentioned above, the films, still containing solvent therein, may be laminated into a laminate to have the desired thickness, and then dried. Through the process, the solvent may be removed from the film laminate, and the resulting film laminate with intended substrate having the desired thickness can be obtained. In this process, if desired, the films to be laminated may be optionally pressed. Also if desired, a metal conductor layer of, for example, copper may be sandwiched between the films to be laminated into the intended, multi-layered substrate.

Having the ability to form patterns, the polymer material of low relative permittivity of the invention is especially favorable for photosensitive layers in laminate boards such as copper-clad laminate boards. Accordingly, the substrate of the invention encompasses laminate boards of any type having, for example, a metal layer of copper or the like on an insulating substrate base and having thereon a photosensitive layer of the polymer material of low relative permittivity.

Examples of the invention are mentioned below, which, however, are not intended to restrict the scope of the invention.

Production Example 1

85 parts by weight of dicyclohexyl fumaric diester (di-CHF) and 15 parts by weight of glycidyl acrylate (GAA) were put into a glass ampoule, to which were added 1 part by weight of a radical polymerization initiator, azobisisobutyronitrile (AIBN) and 10 parts by weight of pure benzene. With these therein, the glass ampoule was fully purged with nitrogen, then repeatedly subjected to pressure reduction and degassing, and then heat-sealed in vacuum. Next, this was put into a thermostat kept at 40° C., and left therein for 72 hours. After the monomer polymerization in that condition, the liquid product was poured into a large amount of methanol, in which the polymer was deposited and separated. The resulting deposit was dried under reduced pressure to be the intended copolymer.

Procuction Example 2

A copolymer was produced in the same manner as in Production Example 1, for which, however, glycidyl methacrylate (GMA) was used in place of GAA.

Production Example 3

A copolymer was produced in the same manner as in Production Example 1, for which, however, 3,4-epoxycyclohexylmethanol acrylate (ECHMA, Daicel Chemical Industries' CYCLOMER A200™) was used in place of GAA.

Production Example 4

A copolymer was produced in the same manner as in Production Example 1, for which, however, 10 parts by weight of diisopropyl fumaric diester (di-iPF), 70 parts by weight of di-CHF and 20 parts by weight of GAA were used, and 0.1 parts by weight of a radical polymerization initiator, diisopropyl peroxydicarbonate (IPP) was used.

Comparative Production Example 1

A polymer of di-iPF was produced in the same manner as in Production Example 1, for which, however, 100 parts by weight of di-iPF alone was used.

Comparative Production Example 2

A polymer of di-CHF was produced in the same manner as in Production Example 1, for which, however, 100 parts by weight of di-CHF alone was used.

The number-average molecular weight Mn and various properties of the polymers and copolymers obtained in Production Examples 1 to 5 and Comparative Production Examples 1 and 2 are shown in Table 1 below.

EXAMPLE 0.5 g of the polymer obtained in any of Production Examples 1 to 5 or Comparative Examples 1 and 2 was dissolved in 50 ml of benzene, to which was added 0.5% by weight, relative to the solid content of the polymer, of a polymerization initiator (Asahi Denka Kogyo's Adekaoptomer SP-150™). The resulting solution was cast into a laboratory dish having a smooth surface and having a diameter of about 20 cm, and then benzene was gradually evaporated away to form a film in the dish. Next, the film was exposed to UV rays to a degree of accumulated radiation energy of 20 J/cm$^2$, using a high-pressure mercury lamp (80 W×1), and the resin properties of the thus-exposed film were measured. The data are given in Table 1.

TABLE 1

| | | Physical Properties of Polymers, Copolymers | | | | Physical Properties of Polymer or Copolymer Films after exposed to UV rays | | | |
|---|---|---|---|---|---|---|---|---|---|
| Production Example No. | Monomers(s) polymerized (ratio by weight) | Solubility in Benzene | Molecular Weight (Mn) | Softening Point (° C.) | Solubility in Benzene/THF | Relative Dielectric Constant ε 1 GHz/2 GHz/ 5 GHz | Dielectric Loss Tangent, tanσ 1 GHz/2 GHz/ 5 GHz | Adhesiveness | Soldering Heat Resistance |
| Production Example 1 | di-CHF(85)/GAA(15) | soluble | 23.2 × 10$^4$ | 300 | insoluble/insoluble | 2.5/2.4/2.6 | 3.1/3.3/3.0 (× 10$^{-3}$) | A | A |
| Production Example 2 | di-CHF(85)/GMA(15) | soluble | 21.5 × 10$^4$ | 299 | insoluble/insoluble | 2.6/2.5/2.3 | 3.0/2.8/2.5 (× 10$^{-3}$) | A | A |
| Production Example 3 | di-CHF(85)/ECHMA(15) | soluble | 27.8 × 10$^4$ | 308 | insoluble/insoluble | 2.2/2.3/2.1 | 2.7/2.7/2.6 (× 10$^{-3}$) | A | A |
| Production Example 4 | di-iPF(10)/di-CHF(70)/GAA(20) | soluble | 29.4 × 10$^4$ | 302 | insoluble/insoluble | 2.7/2.7/2.6 | 3.3/3.5/3.5 (× 10$^{-3}$) | A | A |
| Production Example 5 | di-iPF(5)/di-CHF(60)/ECHMA(35) | soluble | 26.2 × 10$^4$ | 303 | insoluble/insoluble | 2.3/2.4/2.3 | 2.6/2.8/2.4 (× 10$^{-3}$) | A | A |
| Comparative Production Example 1 | di-iPF(100) | soluble | 10.3 × 10$^4$ | 260 | soluble/soluble | 2.1/2.0/2.2 | 5.1/4.8/5.4 (× 10$^{-3}$) | B | B |
| Comparative Production Example 2 | di-CHF(100) | soluble | 12.3 × 10$^4$ | 300 | soluble/soluble | 2.0/2.1/2.2 | 1.8/2.0/1.9 (× 10$^{-3}$) | B | B |

Production Example 5

A copolymer was produced in the same manner as in Production Example 1, for which, however, 5 parts by weight of di-iPF, 60 parts by weight of di-CHF and 35 parts by weight of ECHMA were used, and 0.1 parts by weight of a radical polymerization initiator, diisopropyl peroxydicarbonate (IPP) was used.

Solubility: The polymer or copolymer or its film was dipped overnight in benzene or THF.

Molecular weight: Measured through GPC (gel permeation chromatography) in terms of a standard, styrene.

Softening point: Measured according to JIS K7126.

Dielectric Properties: The film formed on a smooth laboratory dish was cut into a sample piece having a predetermined size, and its dielectric constant and dielectric loss tangent were measured at 1 GHz, 2 GHz and 5 GHz according to a method of perturbation.

Adhesiveness: Copper was deposited on the polymer or copolymer film through vacuum evaporation, and the copper layer adhesion to the film was tested according to a 180-degree peeling test method using an adhesive cellophane tape.

A indicates excellent samples; B indicates good samples; C indicates average samples; and D indicate bad samples.

Soldering heat resistance: Measured according to JIS C0054, at 260° C. for 120 seconds.

A indicates excellent samples; B indicates good samples; C indicates average samples; and D indicate bad samples.

As in Table 1, the films of the polymer material of Production Examples 1 to 5 of the invention changed insoluble in benzene and in THF, after exposed to UV rays. This confirms the pattern formability of these films. In addition, the films well adhered to metal, and had good heat resistance in soldering. Regarding their electric insulation, the films had a specific dielectric constant ($\in$) falling between 2.1 and 2.7 and a dielectric loss tangent (tanσ) falling between 0.0024 and 0.0035 in high-frequency band level of from 1 GHz to 5 GHz. The data confirm the excellent electric-insulating property of the films.

While the invention has been described in detail and with reference to specific embodiments thereof, it will be apparent to one skilled in the art that various changes and modifications can be made therein without departing from the spirit and scope thereof.

What is claimed is:

1. A polymer material obtained through compolymerization of a monomer composition that contains, as monomers, a fumaric diester and an epoxy group—having (meth)acrylate represented by following formula (II):

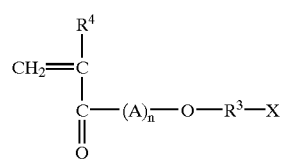

(II)

wherein $R^3$ represents an alkylene group having from 1 to 4 carbon atoms; $R^4$ represents H or $CH_3$; A represents an alkylene oxide having from 2 to 4 carbon atoms; n indicates an integer of from 0 to 2; and X represents

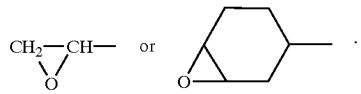

2. The polymer material as claimed in claim 1, wherein the fumaric diester is represented by the following formula (I):

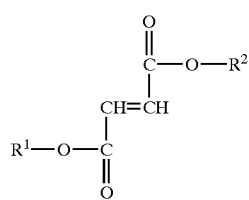

(I)

wherein $R^1$ represents an alkyl group or a cycloalkyl group; $R^2$ represents an alkyl group, a cycloalkyl group or an aryl group; and $R^1$ and $R^2$ may be the same or different.

3. The polymer material as claimed in claim 1, wherein the epoxy group—having (meth)acrylate is represented by following formula (III):

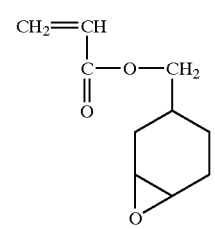

(III)

4. The polymer material as claimed in claim 2, wherein the epoxy group—having (meth)acrylate is represented by following formula (III):

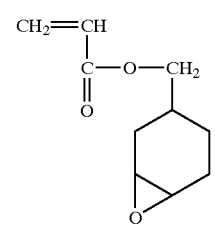

(III)

5. A film of the polymer material of claim 1.

6. A substrate formed of the polymer material of claim 1.

7. An electronic unit formed of the polymer material of claim 1.

* * * * *